United States Patent
Ito et al.

(10) Patent No.: US 12,506,972 B2
(45) Date of Patent: Dec. 23, 2025

(54) OBSERVATION DEVICE, OBSERVATION SYSTEM, AND METHOD FOR CONTROLLING OBSERVATION DEVICE

(71) Applicant: Evident Corporation, Nagano (JP)

(72) Inventors: Shun Ito, Nagano (JP); Shogo Usui, Nagano (JP); Ayumu Sakurai, Nagano (JP)

(73) Assignee: Evident Corporation, Nagano (JP)

( * ) Notice: Subject to any disclaimer, the term of this patent is extended or adjusted under 35 U.S.C. 154(b) by 26 days.

(21) Appl. No.: 18/419,685

(22) Filed: Jan. 23, 2024

(65) Prior Publication Data

US 2024/0259692 A1 Aug. 1, 2024

(30) Foreign Application Priority Data

Jan. 27, 2023 (JP) .................................. 2023-010951

(51) Int. Cl.
*H04N 23/72* (2023.01)
*C12M 1/34* (2006.01)
*H04N 23/73* (2023.01)
*H04N 23/74* (2023.01)

(52) U.S. Cl.
CPC ............ *H04N 23/72* (2023.01); *C12M 41/36* (2013.01); *H04N 23/73* (2023.01); *H04N 23/74* (2023.01)

(58) Field of Classification Search
CPC ........ H04N 23/72; H04N 23/73; H04N 23/74; C12M 41/36; G02B 21/365; G02B 21/06; G02B 21/32; G01N 21/01; G01N 21/84
See application file for complete search history.

(56) References Cited

U.S. PATENT DOCUMENTS

| | | | |
|---|---|---|---|
| 10,281,704 B2 | 5/2019 | Takahashi et al. | |
| 2015/0229889 A1* | 8/2015 | Boettiger | H04N 23/71 348/262 |
| 2019/0062689 A1* | 2/2019 | Ariga | C12M 41/14 |
| 2022/0294964 A1* | 9/2022 | Lou | G02B 7/36 |

FOREIGN PATENT DOCUMENTS

| | | | |
|---|---|---|---|
| JP | 6251454 B2 | 12/2017 | |
| JP | 6989691 B2 | 12/2021 | |

* cited by examiner

*Primary Examiner* — Nasim N Nirjhar
(74) *Attorney, Agent, or Firm* — Holtz, Holtz & Volek PC (57) ABSTRACT

An observation device includes: an illumination system that is disposed on a downward side of a sample and emits illumination light from the downward side toward an upward side of the sample; an imaging system that is disposed on the downward side and images the sample with transmitted light that is reflected on the upward side in the illumination light emitted from the illumination system and is transmitted through the sample from the upward side to the downward side; and a control unit that executes imaging control using the illumination system and the imaging system. The control unit controls an exposure amount in correspondence with required time for the imaging control which includes required operation time and required pause time determined based on imaging conditions.

16 Claims, 10 Drawing Sheets

OBSERVATION DEVICE, OBSERVATION SYSTEM, AND METHOD FOR CONTROLLING OBSERVATION DEVICE

CROSS REFERENCE TO RELATED APPLICATIONS

This application is based upon and claims the benefit of priority from prior Japanese Patent Application No. 2023-010951, filed Jan. 27, 2023, the entire contents of which are incorporated herein by this reference.

TECHNICAL FIELD

The disclosure of this specification relates to an observation device, an observation system, and a method for controlling an observation device.

BACKGROUND

As a device for observing a sample such as a cell as a phase object without staining, a device described in JP 6251454 B2 is known. The device described in JP 6251454 B2 realizes a compact device configuration that can be arranged in a limited space such as the inside of an incubator, for example, by collectively arranging a light source and an imaging optical system on one side of a sample.

SUMMARY

An observation device according to an aspect of the present invention includes: an illumination system that is disposed on a downward side of a sample and emits illumination light from the downward side toward an upward side of the sample; an imaging system that is disposed on the downward side of the sample and images the sample with transmitted light that is reflected on the upward side in the illumination light emitted from the illumination system and is transmitted through the sample from the upward side to the downward side; and a control unit that executes imaging control using the illumination system and the imaging system, and controls an exposure amount in correspondence with required time for the imaging control which includes required operation time and required pause time determined based on imaging conditions.

BRIEF DESCRIPTION OF DRAWINGS

The present invention will be more apparent from the following detailed description when the accompanying drawings are referenced.

DESCRIPTION OF EMBODIMENTS

Since the observation device described in JP 6251454 B2 images a sample by using light reflected from a lid of a container, the amount of light tends to be insufficient when a reflectance of the lid of the container is low. In order to secure a sufficient amount of light, it is necessary to take measures such as increasing of exposure time and increasing of illumination luminance.

However, such measures cause an increase in the amount of heat generation in the device, and eventually cause an increase in a device temperature. In the case of handling a biological sample such as a cell, a temperature rise of an observation device may damage the sample, which is undesirable.

Figure 1:
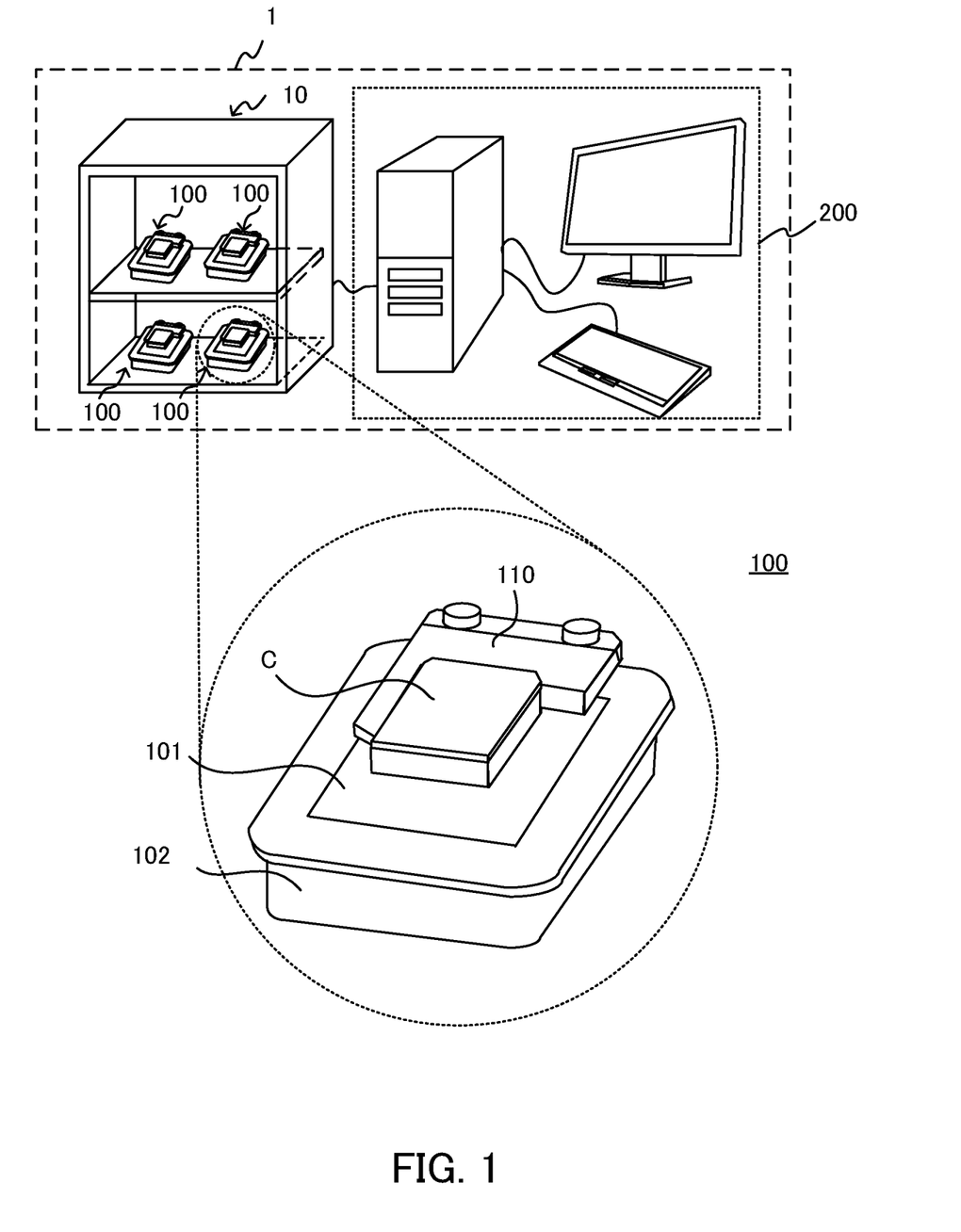
FIG. 1 is a diagram illustrating a configuration of a monitoring system according to an embodiment.
Figure 2:
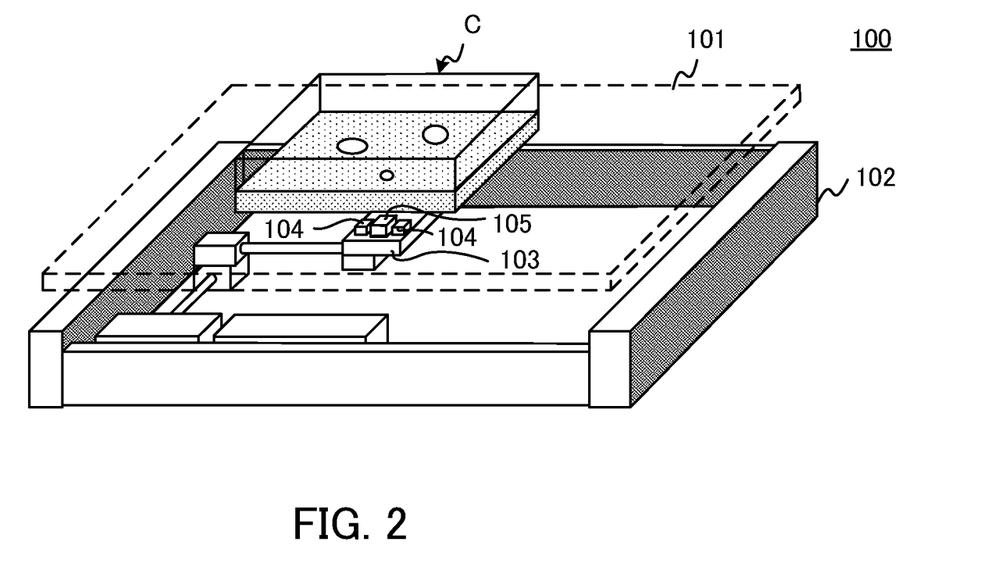
FIG. 2 is a diagram illustrating a configuration of an observation device according to the embodiment.
Figure 3:
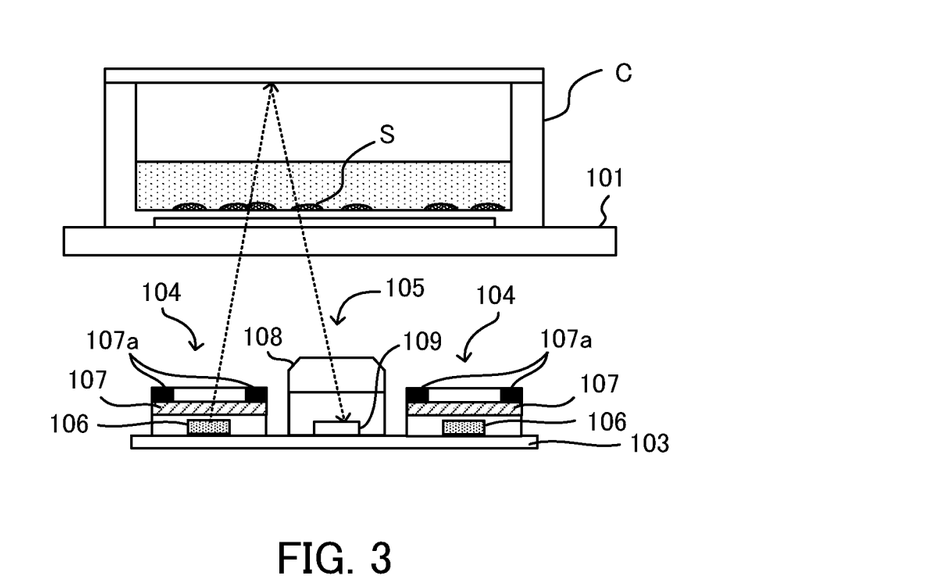
FIG. 3 is a diagram illustrating a configuration of an illumination system and an imaging system included in the observation device according to the embodiment.

FIG. 1 is a diagram illustrating a configuration of a monitoring system according to an embodiment. FIG. 2 is a diagram illustrating a configuration of an observation device according to the embodiment. FIG. 3 is a diagram illustrating a configuration of an illumination system and an imaging system included in the observation device according to the embodiment. A configuration of a monitoring system 1 will be described with reference to FIG. 1 to FIG. 3.

A monitoring system 1 illustrated in FIG. 1 is a monitoring system that monitors a culture state of cells by imaging the cells accommodated in a container C while culturing the cells. The monitoring system 1 includes one or more observation devices 100 which image cultured cells accommodated in a container C from a downward side of the container C, and a control device 200 that controls the observation devices 100. Note that, the cultured cells are an example of a sample, and the sample imaged by the observation device 100 is not limited to the cultured cells.

Each of the observation devices 100 and the control device 200 may exchange data with each other. Therefore, each of the observation devices 100 and the control device 200 may be connected to be communicable in a wired manner or may be connected to be communicable in a wireless manner. In addition, the container C that accommodates the cultured cells is, for example, a flask, a dish, a well plate, or the like, and may be other culture containers.

In order to image the cultured cells without being taken out from the incubator 10, each of the observation devices 100 is used in a state of being disposed in the incubator 10 as illustrated in FIG. 1. More specifically, as illustrated in FIG. 1, the observation device 100 is disposed in the incubator 10 in a state in which the container C is mounted on a transmission window 101 of the observation device 100, and acquires an image of the sample (cultured cells) in the container C according to an instruction transmitted from the control device 200. The transmission window 101 is a transparent top plate constituting an upper surface of a housing 102 of the observation device 100, and constitutes a mounting surface on which the container is mounted. The transmission window 101 is formed from, for example, glass, a transparent resin, or the like.

As illustrated in FIG. 1, the observation device 100 includes a box-shaped housing 102 including the transparent transmission window 101 on which the container C is mounted as an upper surface, and a positioning member 110 that positions the container C at a predetermined position on the transmission window 101 (mounting surface). The positioning member 110 is fixed to the housing 102. However, the positioning member 110 can be removed as necessary, and may be replaced with another positioning member having a different shape in correspondence with a container that is used.

As illustrated in FIG. 2 and FIG. 3, the observation device 100 further includes a stage 103 that moves in the housing 102, a pair of illumination systems 104 which illuminate the sample S that is cultured cells, and an imaging system 105 that acquires an image of the sample S. The stage 103, the illumination system 104, and the imaging system 105 are accommodated in the housing 102. The illumination system 104 and the imaging system 105 are installed on the stage 103, and move with respect to the container C as the stage 103 moves in the housing 102.

The stage 103 changes a relative position of the imaging system 105 with respect to the container C. The stage 103 can move in an X direction and a Y direction which are parallel to the transmission window 101 (mounting surface) and are orthogonal to each other. However, the stage 103 may further move in a Z direction (height direction) orthogonal to both the X direction and the Y direction.

Note that, FIG. 2 and FIG. 3 illustrate an example in which the illumination system 104 and the imaging system 105 are installed on the stage 103, and as a result, move integrally in the housing 102. However, the illumination system 104 and the imaging system 105 may be disposed in the housing 102, that is, on a downward side of the sample S, and may move independently in the housing 102. In addition, FIG. 2 and FIG. 3 illustrate an example in which a pair of illumination systems 104 is arranged on the right and left with the imaging system 105 interposed therebetween, but the arrangement and number of the illumination systems 104 are not limited to this example. For example, three or more illumination systems 104 may be provided on the stage 103, or only one illumination system 104 may be provided.

The illumination system 104 is disposed on a downward side of the sample S accommodated in the container C, and emits illumination light from the downward side of the sample S toward an upward side of the sample S. As illustrated in FIG. 3, the illumination system 104 includes a light source 106 and an illumination optical system 107.

The light source 106 includes, for example, a light-emitting diode (LED) or the like. The light source 106 may include a white LED, or may include a plurality of LEDs emitting illumination light with a plurality of different wavelengths such as red (R), green (G), and blue (B). The illumination light emitted from the light source 106 is incident to the illumination optical system 107.

The illumination optical system 107 includes a diffusion plate and diffuses the illumination light emitted from the light source 106. In addition to the diffusion plate, the illumination optical system 107 may include a lens such as a collimator lens. Further, a mask 107a configured to limit an emission region of diffused light may be formed in the illumination optical system 107. The illumination light (diffused light) emitted from the illumination optical system 107 travels in various directions.

The imaging system 105 is disposed on a downward side of the sample S, and images the sample S with transmitted light that is reflected on the upward side of the sample S and is transmitted through the sample S from the upward side to a downward side in the illumination light emitted from the illumination system 104. In this example, the illumination light is reflected by a lid of the container C located on the upward side of the sample S, and the imaging system 105 images the sample S with the transmitted light transmitted through the sample S from the upward side to the downward side in the reflected light. As illustrated in FIG. 3, the imaging system 105 includes an imaging optical system 108 and an imaging element 109.

The imaging optical system 108 condenses the transmitted light incident into the housing 102 after transmitting through the transmission window 101. The imaging optical system 108 focused to the bottom surface of the container C in which the cultured cells as the sample S are present condenses the transmitted light incident into the housing 102 on the imaging element 109, whereby an optical image of the cultured cells (sample S) is formed on the imaging element 109.

The imaging element 109 is an optical sensor that converts detected light into an electric signal. Specifically, the imaging element 109 is an image sensor and is not particularly limited, but is, for example, a charge-coupled device (CCD) image sensor, a complementary MOS (CMOS) image sensor, or the like.

In the observation device 100, polarized illumination is employed in order to visualize the sample S (cultured cells) in the container C which is a phase object. Specifically, illumination light emitted from the light source 106 is diffused by the illumination optical system 107 and is emitted to the outside of the housing 102 without passing through the imaging optical system 108. Thereafter, a part of the illumination light emitted to the outside of the housing 102 is deflected to an upward side of the sample S after being reflected by the lid of the container C. Further, a part of the illumination light deflected to the upward side of the sample S is used to irradiate the sample S, and is incident into the housing 102 as the transmitted light transmitted through the sample S and the transmission window 101. Then, a part of the transmitted light incident into the housing 102 is condensed by the imaging optical system 108 and forms an image of the sample S on the imaging element 109. Finally, the observation device 100 generates an image of the sample S (cultured cells) on the basis of an electric signal output from the imaging element 109, and outputs the image to the control device 200.

The control device 200 is a device that controls the observation device 100. The control device 200 transmits an imaging instruction to the observation device 100 placed in the incubator 10, and further receives an image acquired by the observation device 100. Furthermore, the control device 200 may execute various types of analysis processing on the acquired image. For example, cultured cells included in the image may be counted, and the number of cells may be measured. In addition, the density or area of the cells may be measured from the image.

In the monitoring system 1 configured as described above, the observation device 100 images the sample S in accordance with the imaging instruction transmitted from the control device 200 to the observation device 100. Therefore, according to the observation device 100 and the monitoring system 1, the sample S can be imaged at any timing without taking out the sample S from the incubator 10, and a culture state of the sample S can be monitored.

In addition, since both the illumination system 104 and the imaging system 105 are disposed on the downward side of the sample S in the observation device 100, the illumination system 104 and the imaging system 105 can be collectively accommodated in the housing 102. As a result, the observation device 100 can be made compact, and can be easily disposed inside the incubator 10 having a limited space.

Further, the observation device 100 images the sample S by polarized illumination using reflected light generated by the lid of the container C. Therefore, even though the sample S is a phase object such as cultured cells, a high-contrast image can be obtained.

Figure 4:
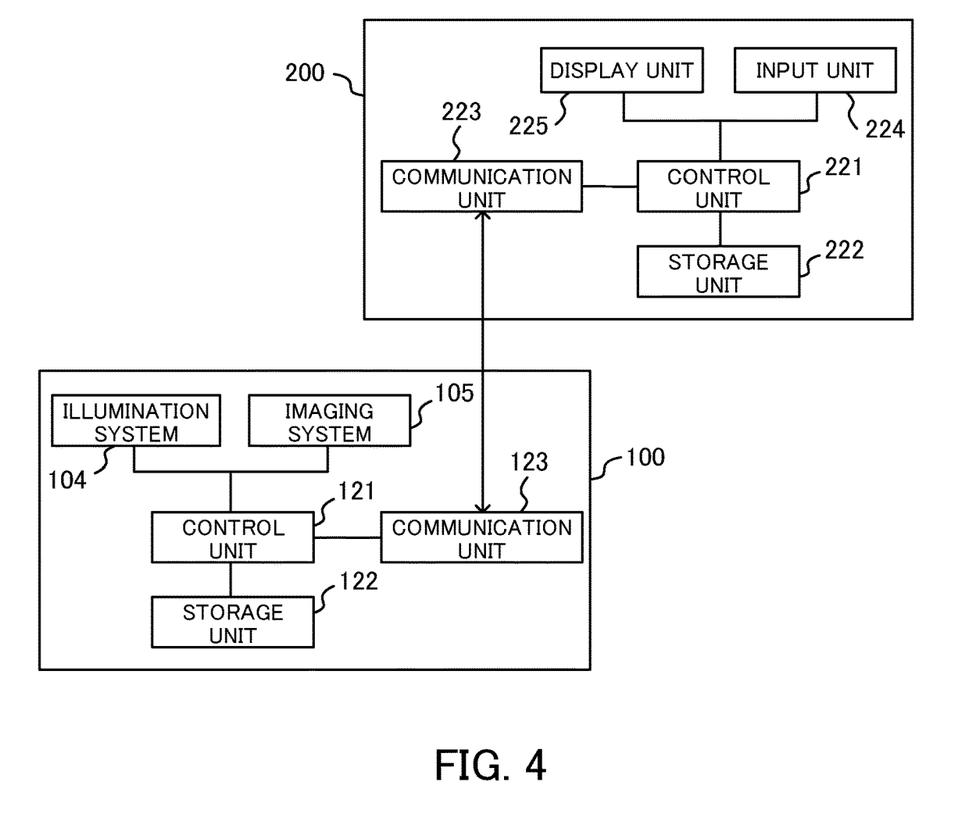
FIG. 4 is a diagram illustrating a functional configuration of the monitoring system according to the embodiment.
Figure 5:
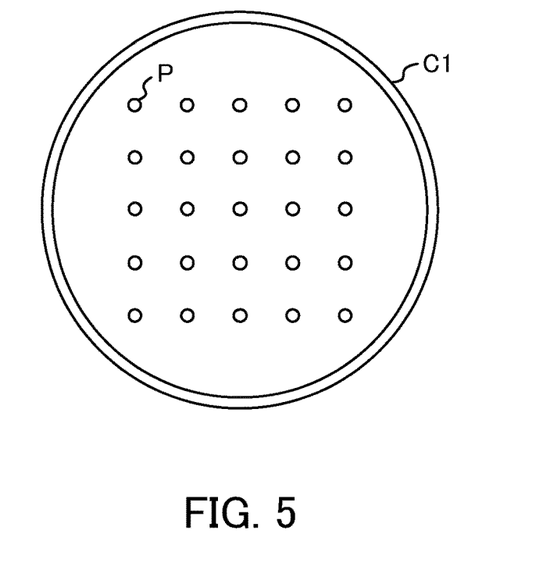
FIG. 5 is a diagram illustrating an arrangement example of a plurality of imaging points provided in a container.
Figure 6:
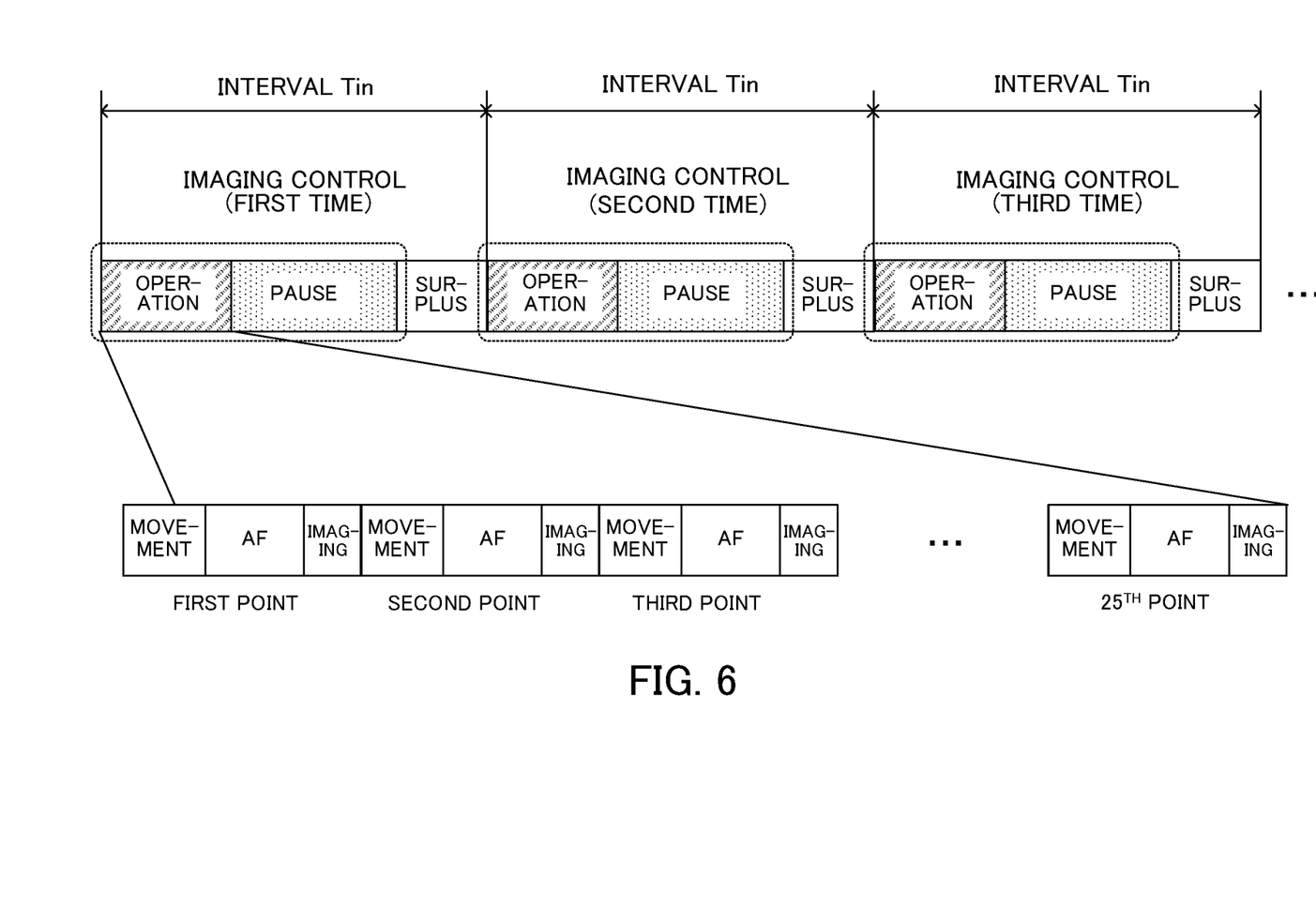
FIG. 6 is a diagram illustrating a configuration of imaging control performed by the observation device according to the embodiment.

FIG. 4 is a diagram illustrating a functional configuration of the monitoring system according to the embodiment. FIG. 5 is a diagram illustrating an arrangement example of a plurality of imaging points provided in a container. FIG. 6 is a diagram illustrating a configuration of imaging control performed by the observation device according to the embodiment. Hereinafter, imaging control performed by the observation device 100 will be described with reference to FIG. 4 to FIG. 6. Here, a case of monitoring the culture state of the sample S in the container C1 by imaging a plurality of points in the container C1 as illustrated in FIG. 5 with time-lapse imaging in which predetermined imaging control is repeatedly executed at an interval set in advance will be described as an example.

As illustrated in FIG. 4, the control device 200 includes a control unit 221, a storage unit 222, a communication unit 223, an input unit 224, and a display unit 225. When a user gives an instruction for imaging by inputting various conditions (hereinafter, noted as imaging conditions) of time-lapse imaging to be performed by the observation device 100 to the control device 200 by using the input unit 224, in the control device 200, the control unit 221 transmits an imaging instruction including the imaging conditions to the observation device 100 through the communication unit 223.

Note that, the imaging conditions include, for example, an imaging point P (in this example, imaging position information of 25 points) inside the container C1 as illustrated in FIG. 5, an interval Tin of time-lapse imaging, the number of times of imaging N, and the like. Furthermore, the imaging conditions may include settings of the observation device 100 (the illumination system 104 or the imaging system 105) such as a parameter of autofocus performed before imaging (illumination luminance, a frame rate, and the like) and a parameter of imaging performed after autofocus (illumination luminance, exposure time, a gain, and the like).

As illustrated in FIG. 4, the observation device 100 includes a control unit 121, a storage unit 122, and a communication unit 123 in addition to the illumination system 104 and the imaging system 105 described above. In the observation device 100, the control unit 121 executes a program stored in the storage unit 122 to execute imaging control using the illumination system 104 and the imaging system 105 in accordance with the imaging instruction received by the communication unit 123. In this example, as illustrated in FIG. 6, the control unit 121 repeatedly executes imaging control for imaging a total of 25 imaging points P in any imaging order a total of N times at an interval Tin.

The image of the sample S acquired by the imaging control is transmitted to the control device 200 through the communication unit 123. In the control device 200, the image received by the control unit 221 through the communication unit 223 is stored in the storage unit 222. The user can confirm the culture state of the sample S by displaying the image stored in the storage unit 222 on the display unit 225.

As described above, the control unit 121 of the observation device 100 basically executes the imaging control according to the imaging conditions included in the imaging instruction transmitted from the control device 200. However, in a case where the imaging control is repeatedly executed in a similar manner as in the time-lapse imaging, the imaging conditions are automatically adjusted as necessary, and the imaging control is executed in accordance with the adjusted imaging conditions. More specifically, the control unit 121 controls an exposure amount by automatically adjusting the imaging conditions in accordance with the required time of the imaging control determined based on the imaging conditions. As a result, it is possible to repeatedly perform imaging such as time-lapse imaging while avoiding excessive heat storage in the observation device 100. Hereinafter, this point will be described in more detail.

The exposure amount stated here is the total amount of light with which one pixel of the imaging element is irradiated during an exposure period corresponding to acquisition of one image, and is calculated as the product of the temporal length of the exposure period (that is, the exposure time) and the amount of light per unit time with which one pixel of the imaging element is irradiated (in this specification, this is referred to as illumination luminance.).

In addition, the exposure amount is an exposure amount related to any imaging performed during imaging control unless otherwise stated. Therefore, the exposure amount may be, for example, an exposure amount in imaging (hereinafter, this is referred to as main imaging as necessary.) of an image recorded for observation by the user in time-lapse imaging. In addition, the exposure amount may be, for example, an exposure amount in imaging of an image that is used for autofocus before the main imaging in time-lapse imaging.

Since the exposure amount is proportional to the product of the exposure time and the illumination luminance, the exposure amount can be controlled by adjusting the illumination luminance. Furthermore, during the autofocus period, the higher the frame rate, the shorter the exposure time. That is, the exposure time is inversely proportional to the frame rate. Therefore, since the exposure amount is inversely proportional to the product of the frame rate and the illumination luminance, it is possible to control the exposure amount by adjusting the frame rate.

In order to repeatedly perform the imaging control at a predetermined interval like the time-lapse imaging, it is necessary that the required time of the imaging control falls within the interval. In addition, when heat is accumulated in a device due to repetitive imaging control, there is a concern that operation abnormality of the device due to heat or damage to the sample may occur. Therefore, the required time for the imaging control includes time (required pause time) for releasing heat generated during the operation time and cooling in addition to the time (required operation time) for the observation device 100 to actually operate for imaging. That is, in order to normally execute the time-lapse imaging, it is desirable that the required time of the imaging control including the required operation time and the required pause time falls within the interval of the time-lapse imaging, that is, as illustrated in FIG. 6, it is desirable that an excess time is generated within the interval.

As illustrated in FIG. 6, the required operation time includes time (movement time) required for the imaging system 105 to move to an imaging point, time (AF time) required for autofocus (AF) at the imaging point, and time (imaging time) required for imaging at the imaging point for the number of imaging points. Note that, the imaging time may include image processing time after the imaging. Since the movement time, the AF time, the imaging time, and the number of imaging points vary in correspondence with the imaging conditions, the required operation time also varies in correspondence with the imaging conditions. Since the required pause time is time for cooling by releasing heat generated during the operation time, the required pause time varies in correspondence with the operation time (more specifically, the amount of heat generated during the operation time). Therefore, similarly to the operation time, the required pause time also varies in correspondence with the imaging conditions. As described above, the required operation time and the required pause time vary in correspondence with the imaging conditions, and thus, the required time for imaging control may not fall within the interval in accordance with the imaging conditions.

When the imaging control is executed under the imaging conditions in which the required time of the imaging control does not fall within the interval, there is inconvenience that the interval of the imaging control cannot be secured or the subsequent imaging control is initiated before the observation device is sufficiently cooled down. Therefore, in a case where the required time determined based on the imaging conditions does not fall within the interval, that is, in a case where the required time exceeds the interval, the control unit 121 of the observation device 100 controls the exposure amount during the imaging control. More specifically, the imaging conditions are updated so that new required time determined based on the updated new imaging conditions falls within the interval, and the exposure amount is controlled based on the new imaging conditions.

Note that, in order to keep the required time of the imaging control within the interval, the required time may be shortened or the interval may be extended. However, it is not desirable that the interval is extended arbitrarily without the intention of the user. Therefore, the observation device 100 does not take a measure of extending the interval. In addition, there are various options for shortening the required time, but among the options, for example, reduction of the number of imaging points is not desirable because it does not conform to the intention of the user as in the case of extending the interval.

Therefore, in the observation device 100, the control unit 121 shortens the required time to fall within the interval by controlling the exposure amount. Since the required operation time and the required pause time are shortened by suppressing the exposure amount used in the imaging control, the required time of the imaging control can also be shortened. The observation device 100 has been devised with focus given to this point, and the control unit 121 updates the parameter related to the exposure amount among the imaging conditions and controls the exposure amount based on the updated imaging conditions.

As described above, in the observation device 100, in a case where the required time determined based on the imaging conditions falls within the interval, the control unit 121 executes the imaging control in accordance with the imaging conditions. As a result, for example, the culture state of the sample can be monitored by images captured by imaging the imaging points designated by the user at designated time intervals. Furthermore, in a case where the required time does not fall within the interval, the control unit 121 updates the parameter related to the exposure amount included in the imaging conditions so that the required time falls within the interval, and executes the imaging control in accordance with the updated imaging conditions. As a result, similarly to the case where the required time falls within the interval, for example, the culture state of the sample can be monitored by images captured by imaging the imaging points designated by the user at the designated time interval. Therefore, according to the observation device 100, it is possible to repeatedly perform imaging such as time-lapse imaging while avoiding excessive heat storage in the observation device 100.

The above-described functional components included in the observation device 100 and the control device 200 can be realized by various circuits. The control unit 121 and the control unit 221 may include, for example, a hardware circuit such as a central processing unit (CPU), a graphics processing unit (GPU), and a field-programmable gate array (FPGA). The control unit 121 executes the program stored in the storage unit 122.

The storage unit 122 and the storage unit 222 are non-transitory computer-readable media, and may include, for example, any semiconductor memory, and may further include the other storage devices. The semiconductor memory includes, for example, a volatile memory, and may further include a nonvolatile memory. The other storage devices may include, for example, a magnetic storage device including a magnetic disk, an optical storage device including an optical disk, and the like.

The communication unit 123 and the communication unit 223 are any communication circuits, and may be, for example, a wired communication module or a wireless communication module. The input unit 224 may include, for example, a keyboard, a mouse, a touch panel, or the like. The display unit 225 may include, for example, a liquid crystal monitor, an organic EL display, a cathode ray tube (CRT) display, or the like. Note that, a touch panel may be built in the display, and the input unit 224 and the display unit 225 may include a touch panel display.

Hereinafter, a specific example of the observation device 100 described above in each embodiment will be described.

First Embodiment

Figure 7:
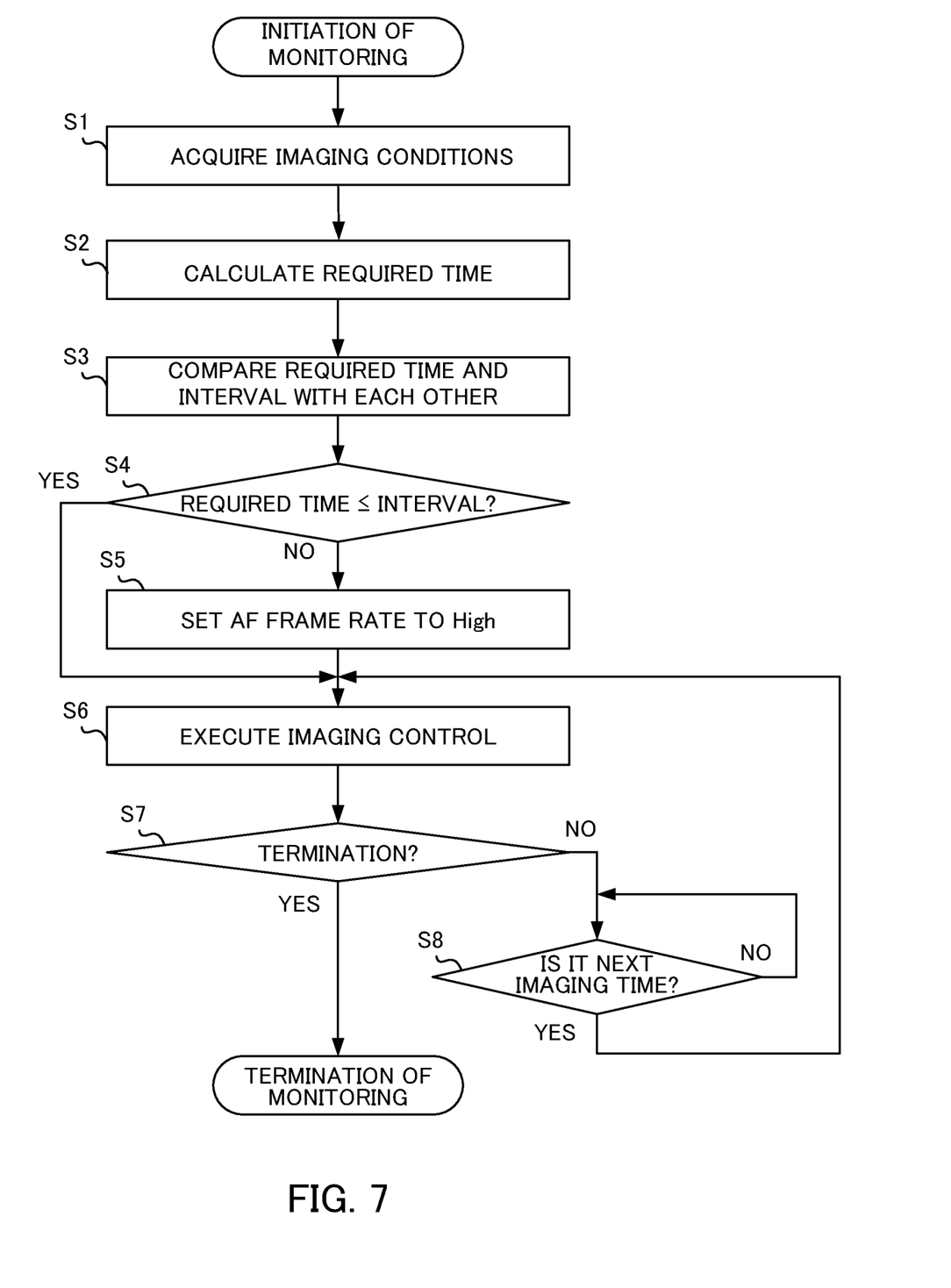
FIG. 7 is a flowchart of processing performed by the observation device according to a first embodiment.
Figure 8:
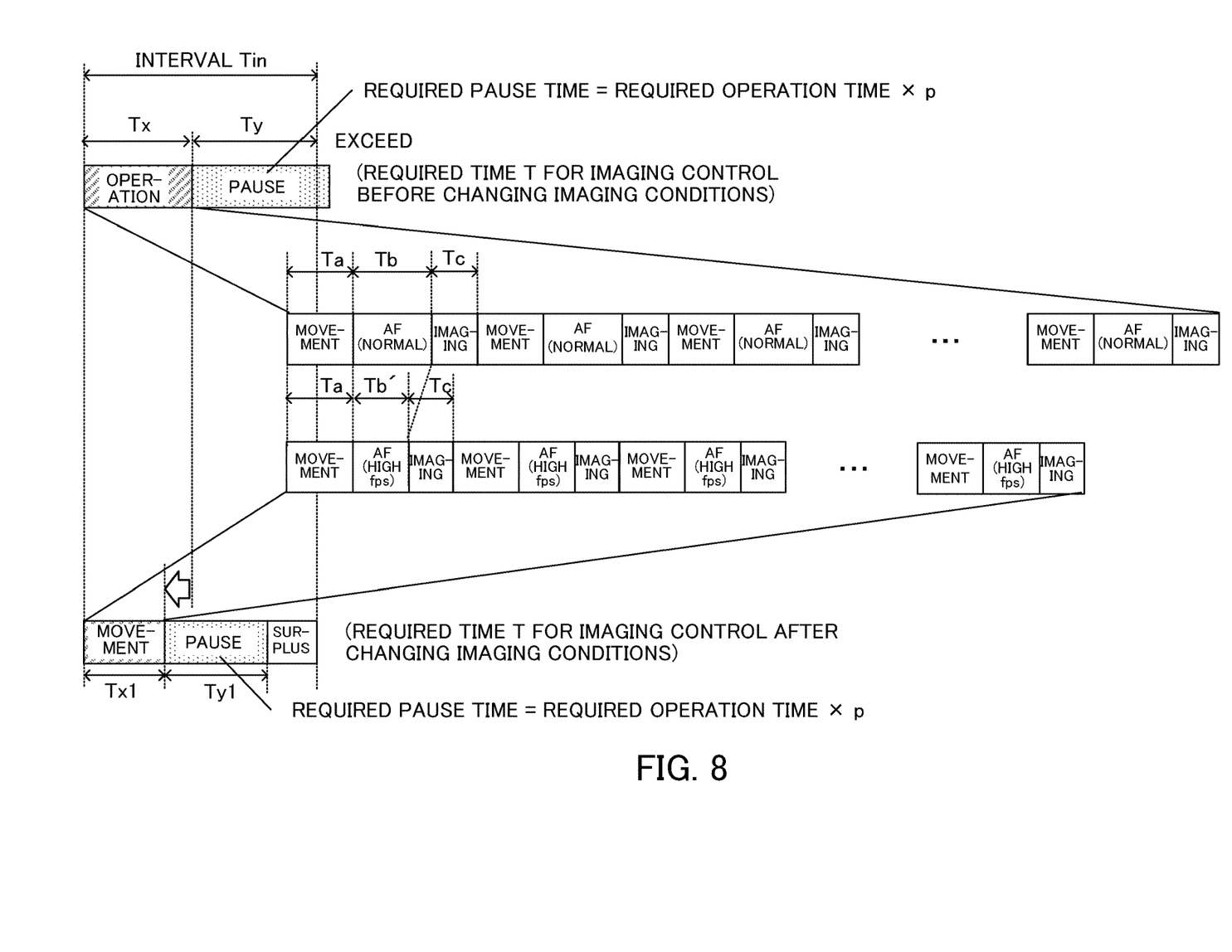
FIG. 8 is a diagram for describing a difference in operation modes in the imaging control performed by the observation device according to the first embodiment.

FIG. 7 is a flowchart of processing performed by the observation device according to the first embodiment. FIG. 8 is a diagram describing a difference in operation modes in the imaging control performed by the observation device according to the first embodiment. Note that, the configuration of the observation device according to this embodiment is similar to that of the observation device 100. Therefore, hereinafter, components of the observation device according to this embodiment are referred to by the same reference numerals as in the components of the observation device 100.

When the imaging instruction is received from a control device, the control unit 121 executes the program stored in the storage unit 122 and initiates the processing illustrated in FIG. 7. First, the control unit 121 acquires imaging conditions (step S1). Here, the control unit 121 acquires the imaging conditions included in an imaging instruction. Furthermore, the control unit 121 may acquire the imaging conditions which are not included in the imaging instruction from the storage unit 122.

Next, the control unit 121 calculates required time T of imaging control based on the imaging conditions acquired in step S1 (step S2). Here, first, the control unit 121 calculates required operation time Tx. Then, the control unit 121 estimates required pause time Ty based on the required operation time Tx, and calculates required time T for imaging control including the required operation time Tx and the required pause time Ty.

The required operation time Tx is calculated based on movement time Ta, AF time Tb, and imaging time Tc. When the number of imaging points is M, the control unit 121 may calculate the required operation time by M×(Ta+Tb+Tc). Note that, the movement time Ta may be considered to be substantially constant without considering the number of imaging points and the imaging order. Furthermore, the control unit 121 may calculate the AF time Tb based on a frame rate of autofocus. As the frame rate of autofocus is higher, the exposure time at the time of acquiring an image at each Z position in order to search for a focus position is shorter, so that the entire AF time Tb is also shorter. On the contrary, the lower the frame rate of autofocus, the longer the exposure time, and thus the entire AF time Tb becomes longer, but the focusing accuracy is improved accordingly. Furthermore, the control unit 121 may calculate the imaging time Tc based on the exposure time at the time of imaging.

The required pause time Ty may be calculated, for example, by multiplying the required operation time Tx by a constant coefficient p. The coefficient p may be determined by an experiment or the like performed in advance. For example, the required pause time may be specified by directly measuring a variation in the temperature of a substrate disposed in the observation device or a temperature (for example, a temperature of a culture medium in a container) of a sample in experiment, and the coefficient p may be calculated back from the required pause time and the required operation time. That is, the control unit 121 may calculate the required pause time Ty by p×M×(Ta+Tb+Tc), and in this case, the required time T of the imaging control is calculated by (1+p)×M×(Ta+Tb+Tc).

Instead of determining the coefficient p for the required operation time Tx, coefficients (coefficients pa, pb, and pc) may be determined for the movement time Ta, the AF time Tb, and the imaging time Tc. The coefficient pa, the coefficient pb, and the coefficient pc may be determined by experiment or the like in a similar manner as in the coefficient p, or may be determined based on the movement time Ta, the AF time Tb, and power consumption per unit time during the imaging time Tc. That is, the control unit 121 may calculate the required pause time Ty by M×(pa×Ta+pb×Tb+pc×Tc) by using the respective coefficients, and in this case, the required time T of the imaging control is calculated by M×{(1+pa)×Ta+(1+pb)×Tb+(1+pc)×Tc}.

When the required time T is calculated, the control unit 121 compares the required time T and the interval Tin with each other (step S3). Then, for example, as illustrated in FIG. 6, in a case where the required time T is equal to or shorter than the interval Tin (YES in step S4), the control unit 121 omits processing in step S5 and executes the imaging control in accordance with the imaging conditions acquired in step S1 (step S6).

On the other hand, as illustrated in FIG. 8, in a case where the required time T exceeds the interval Tin (NO in step S4), the control unit 121 sets a frame rate of autofocus to High (step S5) and changes the imaging conditions.

When the frame rate is set to High, the time Tb required for autofocus is shortened to Tb' (<Tb) as illustrated in FIG. 8. As a result, the required operation time Tx is shortened to Tx1 (<Tx), and the required pause time Ty is shortened to Ty1 (<Ty), and as a result, the required time T of the imaging control is also shortened to fall within the interval Tin.

Thereafter, the control unit 121 executes imaging control in accordance with the imaging conditions updated in step S5 (step S6). That is, in step S5, the control unit 121 updates the frame rate that is a parameter of autofocus which is included in the imaging conditions so that the required time T is shortened and falls within the interval Tin, and in step S6, the control unit 121 controls the exposure amount during the autofocus period based on the updated new imaging conditions.

When the imaging control is terminated, the control unit 121 determines whether or not to terminate the monitoring (step S7). In a case where the imaging control has not been executed by the designated number of times of imaging N, the control unit 121 does not terminate the monitoring (NO in step S7) and executes the imaging control every time the next imaging time arrives (step S6). As a result, imaging control is executed N times at the interval Tin.

As described above, the observation device according to this embodiment can keep the required time of the imaging control within the interval by performing the processing illustrated in FIG. 7. Therefore, time-lapse imaging can be performed while avoiding excessive heat storage in the observation device.

In addition, the observation device according to this embodiment operates without increasing the frame rate of autofocus in a case where the required time calculated based on the imaging conditions does not exceed the interval. That is, the observation device operates in a focusing accuracy priority mode in which high focusing accuracy is realized. On the other hand, when the required time calculated based on the imaging conditions exceeds the interval, the observation device operates to suppress heat generation by increasing the frame rate of autofocus so as to keep the required time within the interval. That is, the observation device operates in an amount-of-heat-generation reduction priority mode in which the amount of heat generation is suppressed. Therefore, even in the case of operating in any mode, according to the observation device according to this embodiment, since imaging performed after autofocus is performed with a sufficient exposure amount, it is possible to perform time-lapse imaging at designated intervals while maintaining the quality of an image that is used for observation by the user.

Second Embodiment

Figure 9:
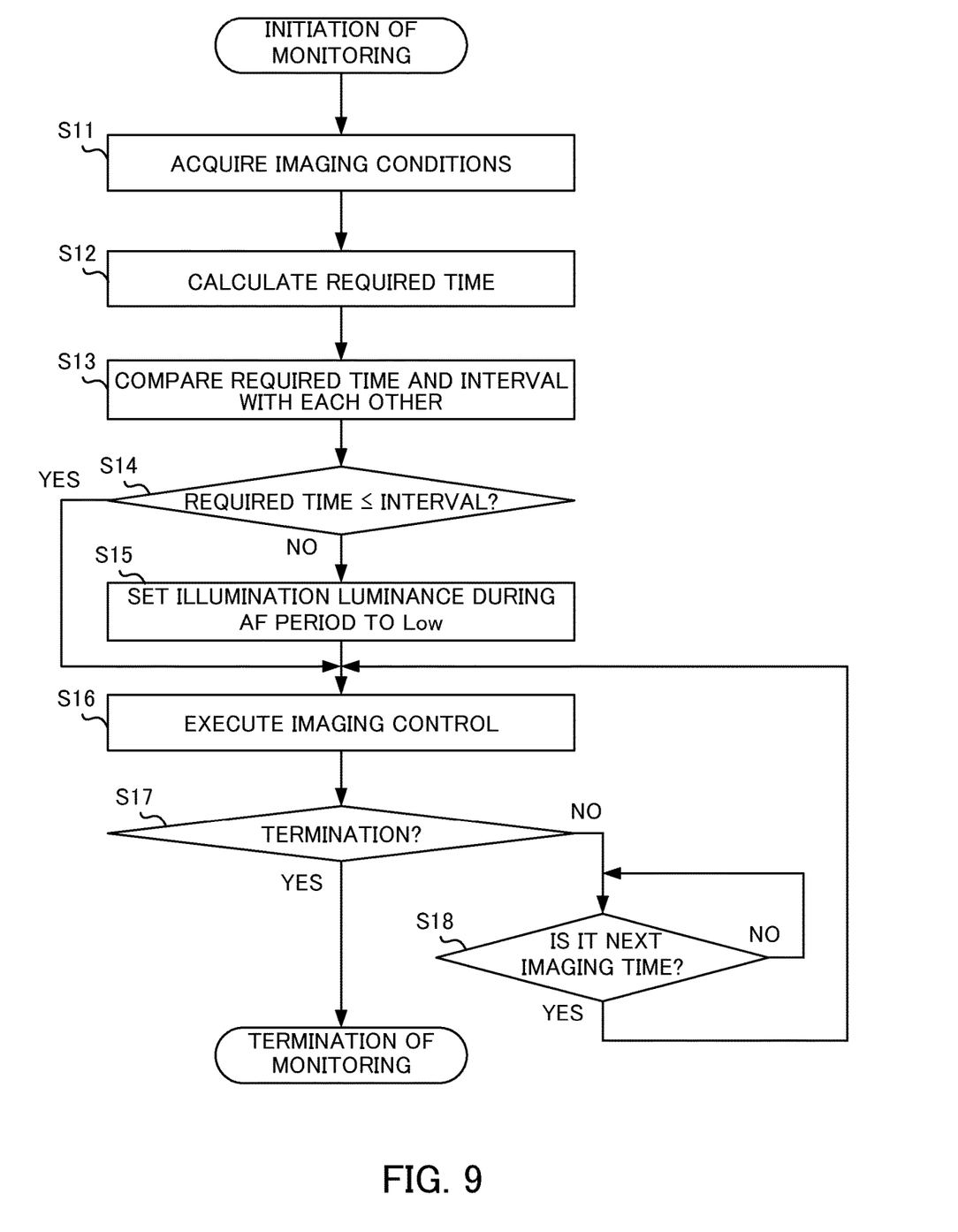
FIG. 9 is a flowchart of processing performed by an observation device according to a second embodiment.
Figure 10:
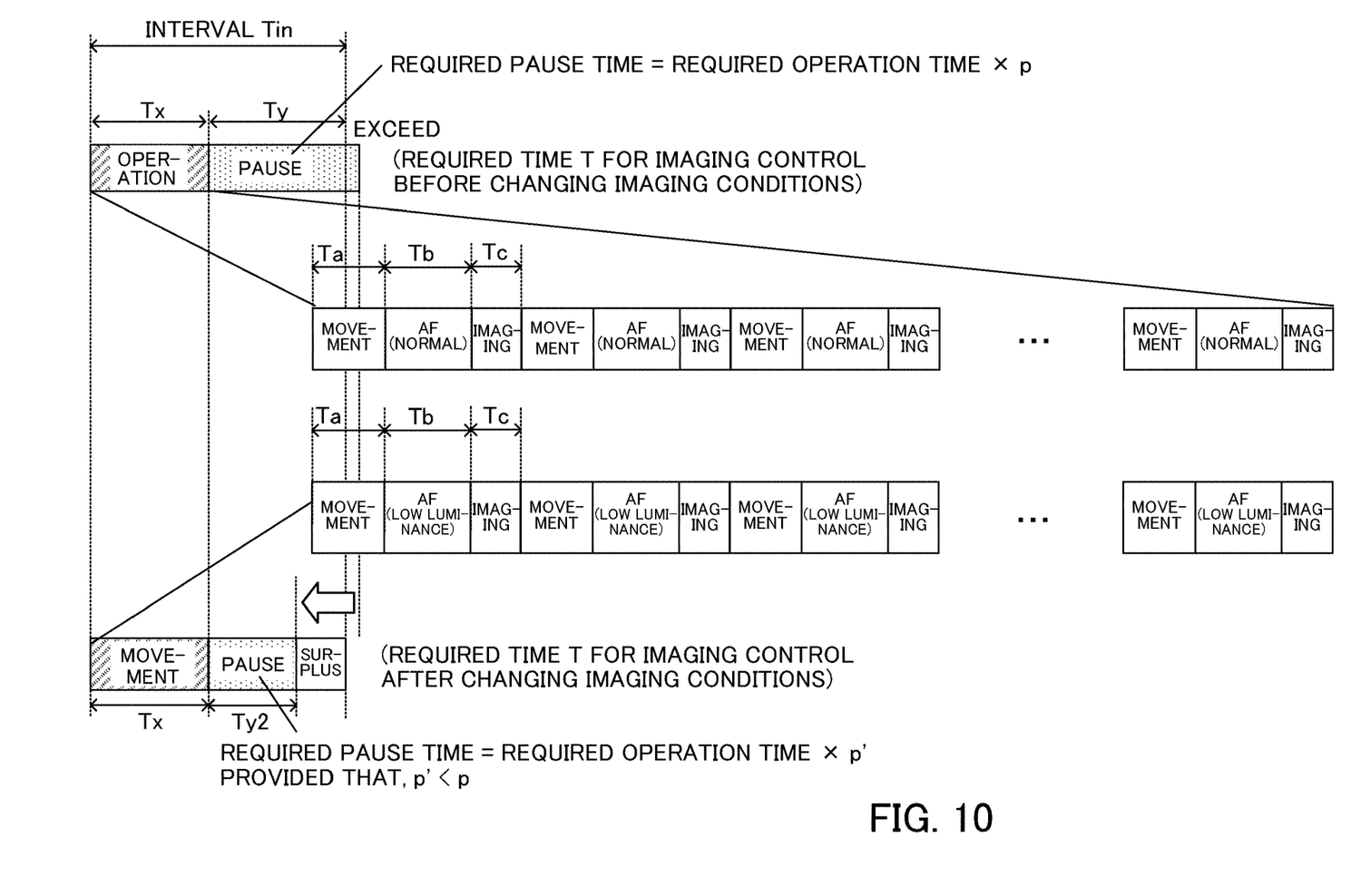
FIG. 10 is a diagram describing a difference in operation modes in the imaging control performed by the observation device according to the second embodiment.

FIG. 9 is a flowchart of processing performed by an observation device according to a second embodiment. FIG. 10 is a diagram illustrating a difference in operation modes in the imaging control performed by the observation device according to the second embodiment. Note that, the configuration of the observation device according to this embodiment is similar to that of the observation device 100. Therefore, hereinafter, components of the observation device according to this embodiment are referred to by the same reference numerals as in the components of the observation device 100.

Furthermore, the processing performed by the observation device according to this embodiment is different from the processing performed by the observation device according to the first embodiment in that the required time is adjusted by changing the illumination luminance during the autofocus period instead of the frame rate of autofocus, but the other processing is similar. Note that, the illumination luminance during the autofocus period can be changed, for example, by changing an output setting of the light source 106 and adjusting the amount of light per unit time which is emitted from the illumination optical system 107.

When the imaging instruction is received from a control device, the control unit 121 executes the program stored in the storage unit 122 and initiates the processing illustrated in FIG. 9. First, the control unit 121 acquires imaging conditions (step S11), and then calculates required time T for imaging control based on the imaging conditions acquired in step S11 (step S12). Furthermore, the control unit 121 compares the required time T calculated in step S12 and the interval Tin with each other (step S13). Note that, the processing from step S11 to step S13 is similar to the processing from step S1 to step S3 illustrated in FIG. 7.

Then, for example, as illustrated in FIG. 6, in a case where the required time T is equal to or shorter than the interval Tin (YES in step S14), the control unit 121 omits the processing in step S15 and executes the imaging control in accordance with the imaging conditions acquired in step S11 (step S16).

On the other hand, as illustrated in FIG. 10, when the required time T exceeds the interval Tin (NO in step S14), the control unit 121 sets the illumination luminance during the autofocus period to Low (step S15) and changes the imaging conditions.

By setting the illumination luminance to Low, as illustrated in FIG. 10, the required operation time Tx is not shortened, but the required pause time Ty is shortened to Ty2 (<Ty) because the amount of heat generation during operation (particularly during AF) is suppressed to be low. As a result, the required time T of the imaging control is shortened, and the required time T falls within the interval Tin.

Note that, the shortened required pause time Ty2 may be calculated, for example, by multiplying the required operation time Tx by a constant coefficient p' (<p). The coefficient p' may be determined by an experiment or the like performed in advance in a state where the illumination luminance is set to Low, and is a value smaller than the above-described coefficient p.

Thereafter, the control unit 121 executes imaging control according to the imaging conditions updated in step S15 (step S16). That is, in step S15, the control unit 121 updates the illumination luminance that is a parameter of autofocus included in the imaging conditions so that the required time T is shortened and falls within the interval Tin, and in step S16, the control unit 121 controls the exposure amount during the autofocus period based on the updated new imaging conditions.

When the imaging control is terminated, the control unit 121 determines whether or not to terminate the monitoring (step S17). In a case where the imaging control has not been executed by the designated number of times of imaging N, the control unit 121 does not terminate the monitoring (NO in step S17) and executes the imaging control every time the next imaging time arrives (step S16). As a result, imaging control is executed N times at the interval Tin.

As described above, also in the observation device according to this embodiment, by performing the processing illustrated in FIG. 9, the required time of the imaging control can be kept within the interval as in the observation device according to the first embodiment. Therefore, time-lapse imaging can be performed while avoiding excessive heat storage in the observation device.

In addition, the observation device according to this embodiment operates without lowering the illumination luminance during the autofocus period in a case where the required time calculated based on the imaging conditions does not exceed the interval. That is, the observation device operates in a focusing accuracy priority mode in which high focusing accuracy is realized. On the other hand, in a case where the required time calculated based on the imaging conditions exceeds the interval, the observation device operates to suppress heat generation by lowering the illumination luminance during the autofocus period and to keep the required time within the interval. That is, the observation device operates in an amount-of-heat-generation reduction priority mode in which the amount of heat generation is suppressed. Therefore, even in the case of operating in any mode, according to the observation device according to this embodiment, since imaging performed after autofocus is performed with a sufficient exposure amount, it is possible to perform time-lapse imaging at designated intervals while maintaining the quality of an image that is used for observation by the user as in the observation device according to the first embodiment.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the constituent elements of each embodiment can be modified without departing from the spirit and scope of the embodiment. Moreover, new embodiments can be implemented by appropriately combining a plurality of constituent elements disclosed in one or more of the embodiments. Furthermore, some constituent elements may be omitted from the constituent elements in each of the embodiments, or some constituent elements may be added to the constituent elements in each of the embodiments. Moreover, the order of the processing described in each of the embodiments may be changed as long as there is no contradiction. That is, the observation device, the observation system, and the method for controlling the observation device of the invention can be variously modified and changed without departing from the scope of the appended claims.

In the above-described embodiment, an example has been described in which one of the frame rate of autofocus and the illumination luminance during the autofocus period is updated in a case where the required time exceeds the interval, but both of these may be updated. In addition, the number of parameters or parameters to be updated may be changed depending on how much the required time exceeds the interval. For example, in a case where the required time slightly exceeds the interval, the control unit 121 may update only the frame rate, and in a case where the required time significantly exceeds the interval, the control unit 121 may update both the frame rate and the illumination luminance.

In the second embodiment described above, the example in which the illumination luminance during the autofocus period is updated in a case where the required time exceeds the interval has been described, but the overall illumination luminance during the imaging control may be updated without limitation to the illumination luminance during the autofocus period. As a result, since the illumination luminance at the time of imaging performed subsequent to the autofocus is also weakened in addition to the time of autofocus, heat generation can be further suppressed, and the required time can be further shortened.

Furthermore, in the above-described embodiment, an example in which the required time is calculated based on the setting of the observation device which is included in the imaging conditions such as the frame rate and the illumination luminance has been described, but the required time may be calculated in consideration of the surrounding environment of the observation device in addition to the setting of the observation device. For example, since longer time is taken for cooling as an internal temperature inside the incubator 10 is higher, the control unit 121 may estimate the required pause time based on the internal temperature inside the incubator 10 in addition to the imaging conditions (setting of the observation device). According to this, more accurate required time can be calculated. Note that, the observation device 100 may acquire the internal temperature of the incubator 10 from the incubator 10 through the control device 200, or may acquire the internal temperature by measuring the internal temperature with a temperature sensor provided in the observation device 100 itself.

Furthermore, in the above-described embodiment, an example in which a plurality of points are imaged during one imaging control, that is, a series of imaging processing has been described, but only one imaging point may be included in one imaging control. In addition, each of one or more imaging points included in one imaging control may be imaged a plurality of times by switching a wavelength of illumination light.

Furthermore, in the above-described embodiment, the time-lapse imaging has been described as an example, but the above-described observation device may be used for imaging other than the time-lapse imaging, and is useful in any imaging in which imaging control is repeatedly performed.

Furthermore, in the above-described embodiment, an example in which the exposure amount after the imaging control is controlled by updating the imaging conditions only once before initiation of the first imaging control has been described, but the imaging condition may be updated as appropriate. For example, in a case where an interval between the imaging controls is not constant, the imaging conditions may be updated for every imaging control. Furthermore, in a case where an important imaging point in the multi-point imaging is known in advance, the operation may be performed in the focusing accuracy priority mode at the important imaging point, and the operation may be performed in the amount-of-heat-generation reduction priority mode at the other imaging points. That is, the imaging conditions may be updated for every imaging point.

Furthermore, in the above-described embodiment, an example in which the imaging conditions are updated by comparing the required time with the interval between the imaging controls has been described, but the comparison target with the required time is not limited to the interval. For example, time shorter than the interval to some extent may be compared with the required time by assuming that the required time may fluctuate due to some factors. That is, the control unit 121 may perform control to update the imaging conditions in a case where the required time exceeds a threshold determined in advance. Typically, the threshold is an interval between the imaging controls, but there is no limitation to the interval.

Furthermore, in the above-described embodiment, an example in which the required operation time is calculated based on the imaging conditions has been described, but the required operation time may be measured by executing imaging control. For example, the control unit 121 operates the first imaging control in the focusing accuracy priority mode regardless of the imaging conditions, and actually measures the required operation time at that time. Before initiation of the subsequent imaging control, the required time of the imaging control is estimated by using the actually measured required operation time, and when the required time exceeds the interval, the next imaging control may be operated in the amount-of-heat-generation reduction priority mode.

Since the setting of the illumination luminance and the exposure time is likely to be large and heat is likely to be generated because the observation device according to the above-described embodiment performs imaging by using the illumination light reflected by the lid with a low reflectance, and heat is likely to be accumulated in the device due to the compact configuration, the above-described control is particularly effective. However, the observation device that performs the above-described control is not limited to a configuration in which imaging is performed by using the illumination light reflected by the lid. This is because the inconvenience caused by the required time exceeding the interval may occur without limitation to the observation device that performs imaging by using the illumination light reflected by the lid.

Figure 11:
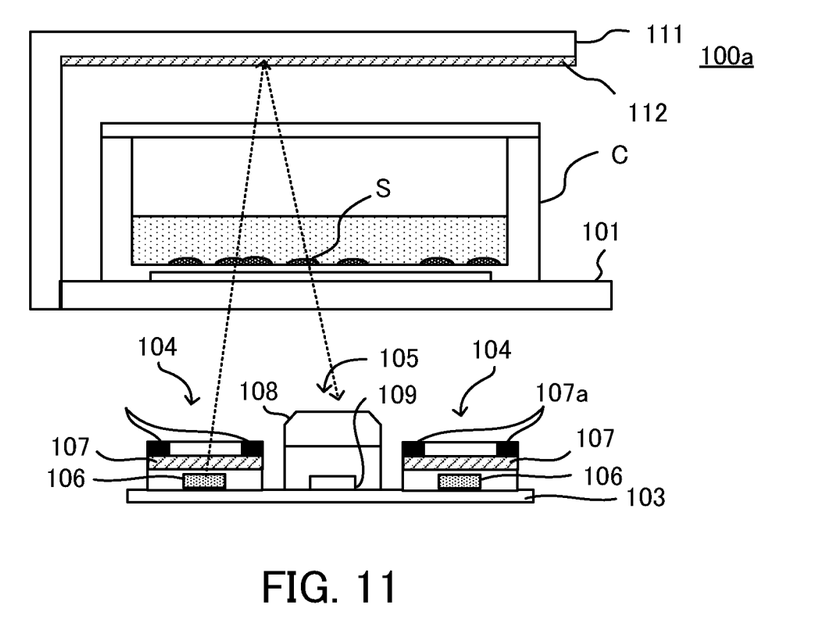
FIG. 11 is a diagram illustrating a modification example of the configuration of the observation device according to the embodiment.

FIG. 11 is a diagram illustrating a modification example of the configuration of the observation device according to the embodiment. As in an observation device 100a illustrated in FIG. 11, the observation device itself may include a reflecting member 112 that reflects the illumination light on the upward side of the sample, or may perform imaging by using the illumination light reflected by the reflecting member 112. Note that, the observation device 100a can acquire a brighter image in comparison to the observation device 100 by performing imaging by using the illumination light reflected by the reflecting member 112 provided on a lower surface of a support column 111 extending to an upward side of the sample S. Note that, the support column 111 may also serve as the positioning member 110 illustrated in FIG. 1.

Figure 12:
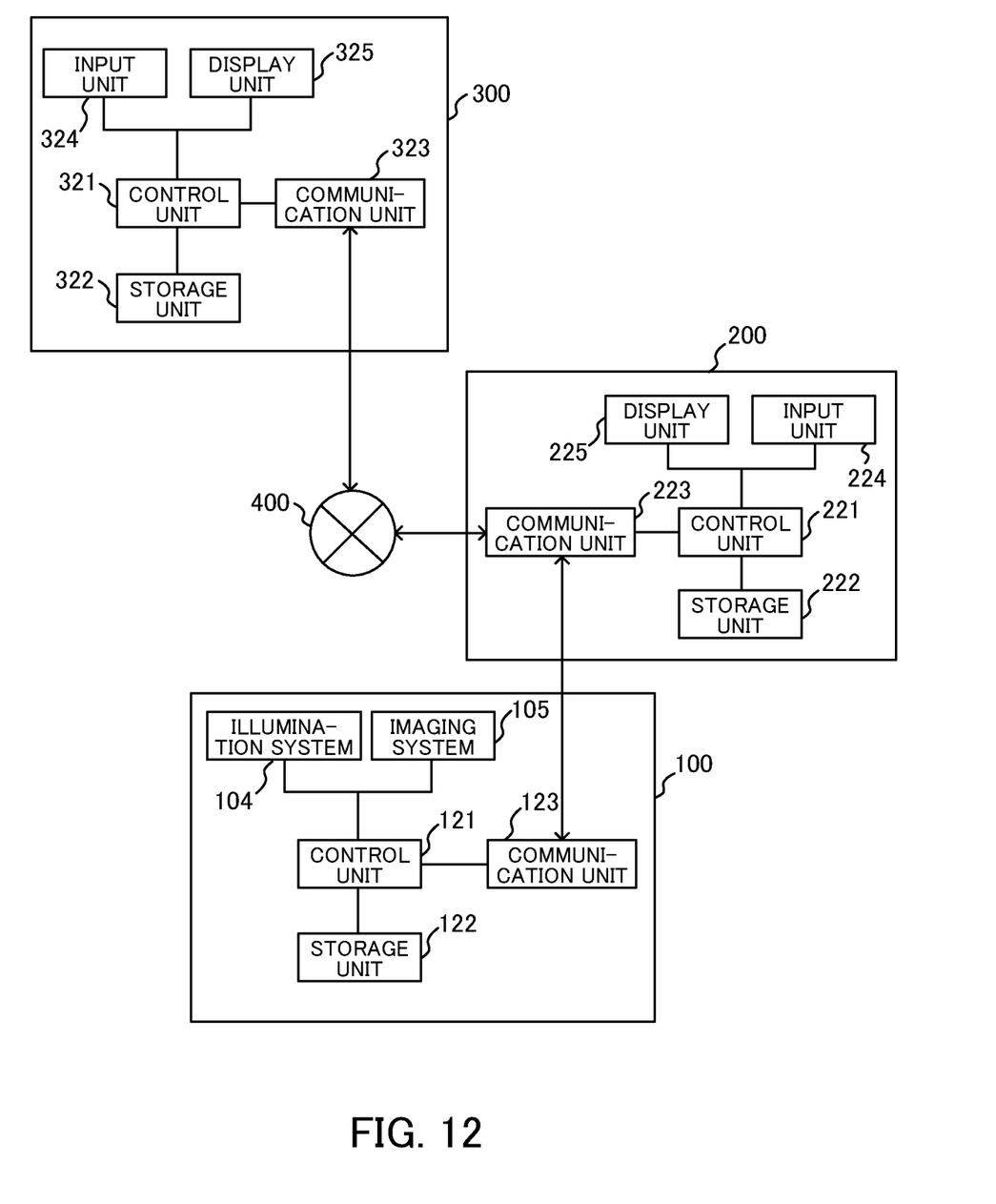
FIG. 12 is a diagram illustrating a modification example of the configuration of the monitoring system according to the embodiment.

FIG. 12 is a diagram illustrating a modification example of the configuration of the monitoring system according to the embodiment. In the above-described embodiment, an example in which the control unit of the observation device determines whether or not the required time exceeds the interval and controls the exposure amount has been described, but the control processing may be performed by a device other than the observation device. For example, the monitoring may be performed by the control device 200 (control unit 221) of the monitoring system 1 illustrated in FIG. 1. Furthermore, as illustrated in FIG. 12, in a case where a user designates the imaging conditions by using a user terminal 300 separate from the control device 200 that controls the observation device 100, the control processing may be performed in the user terminal 300 (control unit 321). The user terminal 300 includes, for example, a control unit 321, a storage unit 322, a communication unit 323, an input unit 324, and a display unit 325, and the control unit 321 may perform the above-described control processing. Although not particularly limited, the user terminal 300 may be connected to the control device 200 through a public line such as the Internet 400.

In the present specification, the expression "based on A" does not indicate "based on only A" but indicates "based on at least A" and further indicates "based partially on at least A". That is, "based on A" may indicate "based on B in addition to A" or "based on a part of A".

The invention claimed is:

1. An observation device, comprising:
    a housing including a transmission window on an upper side thereof and through which a sample is to be observed, the transmission window constituting a mounting surface on which the sample is to be mounted for observation;

an illumination system that is disposed in the housing on a downward side of the transmission window and emits illumination light from the downward side toward an upward side of the transmission window, such that in a state in which the sample is mounted on the transmission window, the illumination system emits illumination light from a downward side of the sample toward an upward side of the sample;

an imaging system that is disposed in the housing on the downward side of the transmission window and, in the state in which the sample is mounted on the transmission window, images the sample with transmitted light, the transmitted light being a portion of the illumination light emitted from the illumination system that is reflected onto the upward side of the sample from a reflective surface disposed above the sample and is transmitted through the sample and the transmission window from the upward side of the sample toward the downward side of the transmission window, to reach the imaging system; and a control unit that executes imaging control using the illumination system and the imaging system in accordance with set imaging conditions, and controls an exposure amount in correspondence with a required time for the imaging control which includes a required operation time and a required pause time which are dependent on the set imaging conditions, wherein the control unit:

determines, based on the set imaging conditions for the imaging control, the required time for the imaging control, the required time including the required operation time and the required pause time, determines whether or not the required time exceeds a threshold, and in response to a determination that the required time exceeds the threshold:

updates at least one of the imaging conditions to obtain new imaging conditions so that a new required time determined based on the new imaging conditions falls within the threshold, and controls the exposure amount based on the new imaging conditions.

2. The observation device according to claim 1, wherein the observation device performs time-lapse imaging in which the imaging control is repeatedly executed at an interval set in advance, and the threshold is the interval.

3. The observation device according to claim 2, wherein in response to the determination that the required time exceeds the interval, the control unit
updates a parameter of autofocus which is included in the imaging conditions so that the new required time falls within the interval, and
controls an exposure amount during a period of the autofocus based on the new imaging conditions.

4. The observation device according to claim 3, wherein the parameter of the autofocus is a frame rate of the autofocus.

5. The observation device according to claim 3, wherein the parameter of the autofocus is illumination luminance during the period of the autofocus.

6. The observation device according to claim 1, wherein in response to the determination that the required time exceeds the threshold, the control unit updates an illumination luminance included in the imaging conditions so that the new required time falls within the threshold.

7. The observation device according to claim 1, wherein the control unit estimates the required pause time based on the required operation time.

8. The observation device according to claim 7, wherein the required operation time includes time required for movement of the imaging system, time required for autofocus, and time required for imaging.

9. The observation device according to claim 7, wherein the control unit acquires a temperature of a surrounding environment in which the observation device is disposed, and further estimates the required pause time based on the acquired temperature of the surrounding environment.

10. The observation device according to claim 1, further comprising:
a reflecting member comprising the reflective surface that reflects the illumination light onto the upward side of the sample.

11. An observation system, comprising:
an observation device; and
a control device that controls the observation device, wherein
the observation device includes
a housing including a transmission window on an upper side thereof and through which a sample is to be observed, the transmission window constituting a mounting surface on which the sample is to be mounted for observation,
an illumination system that is disposed in the housing on a downward side of the transmission window and emits illumination light from the downward side toward an upward side of the transmission window, such that in a state in which the sample is mounted on the transmission window, the illumination system emits illumination light from a downward side of the sample toward an upward side of the sample, and
an imaging system that is disposed in the housing on the downward side of the transmission window and, in the state in which the sample is mounted on the transmission window, images the sample with transmitted light, the transmitted light being a portion of the illumination light emitted from the illumination system that is reflected onto the upward side of the sample from a reflective surface disposed above the sample and is transmitted through the sample and the transmission window from the upward side of the sample toward the downward side of the transmission window, to reach the imaging system, and
the control device executes imaging control using the illumination system and the imaging system in accordance with set imaging conditions, and controls an exposure amount of the observation device in correspondence with a required time for the imaging control which includes a required operation time and a required pause time which are dependent on the set imaging conditions, wherein the control device:

determines, based on the set imaging conditions for the imaging control, the required time for the imaging control, the required time including the required operation time and the required pause time, determines whether or not the required time exceeds a threshold, and in response to a determination that the required time exceeds the threshold:

updates at least one of the imaging conditions to obtain new imaging conditions so that a new required time determined based on the new imaging conditions falls within the threshold, and controls the exposure amount based on the new imaging conditions.

12. A method for controlling an observation device, the observation device comprising (a) a housing including a transmission window on an upper side thereof and through which a sample is to be observed, the transmission window constituting a mounting surface on which the sample is to be mounted for observation, (b) an illumination system that is disposed in the housing on a downward side of the transmission window and emits illumination light from the downward side toward an upward side of the transmission window, such that in a state in which the sample is mounted on the transmission window, the illumination system emits illumination light from a downward side of the sample toward an upward side of the sample, and (c) an imaging system that is disposed on the downward side of the transmission window and, in the state in which the sample is mounted on the transmission window, images the sample with transmitted light, the transmitted light being a portion of the illumination light emitted from the illumination system that is reflected onto the upward side of the sample from a reflective surface disposed above the sample and is transmitted through the sample and the transmission window from the upward side of the sample toward the downward side of the transmission window, to reach the imaging system, the method comprising:

executing imaging control using the illumination system and the imaging system in accordance with set image conditions, and controlling an exposure amount in correspondence with a required time for the imaging control including a required operation time and a required pause time which are dependent on the set imaging conditions;

wherein controlling the exposure amount comprises:

determining, based on the set imaging conditions for the imaging control, the required time for the imaging control including the required operation time and the required pause time;

setting the imaging conditions so that the required time falls within a threshold; and controlling the exposure amount in accordance with the set imaging conditions.

13. The observation device according to claim 1, wherein the observation device performs time-lapse imaging in which the imaging control is repeatedly executed at an interval set in advance, and the threshold is time shorter than the interval.

14. The observation device according to claim 1, wherein the required operation time is an amount of time required for the observation device to operate in accordance with the set imaging conditions to perform imaging of the sample, and the required pause time is an amount of time required for cooling by releasing heat generated by the observation device operating to perform the imaging during the required operation time.

15. An observation device, comprising:

an illumination system that is disposed on a downward side of a sample and emits illumination light from the downward side toward an upward side of the sample;

an imaging system that is disposed on the downward side of the sample and images the sample with transmitted light that is reflected on the upward side in the illumination light emitted from the illumination system and is transmitted through the sample from the upward side to the downward side; and a control unit that executes imaging control using the illumination system and the imaging system, and controls an exposure amount in correspondence with required time for the imaging control which includes required operation time and required pause time determined based on imaging conditions, wherein when the required time exceeds a threshold, the control unit updates the imaging condition so that a new required time determined based on the updated new imaging conditions falls within the threshold, and controls the exposure amount based on the new imaging conditions, wherein the observation device performs time-lapse imaging in which the imaging control is repeatedly executed at an interval set in advance, and the threshold is the interval, wherein when the required time exceeds the interval, the control unit updates a parameter of autofocus which is included in the imaging conditions so that the new required time falls within the interval, and controls an exposure amount during a period of the autofocus based on the new imaging conditions, and wherein the parameter of the autofocus is illumination luminance during the period of the autofocus.

16. An observation device, comprising:

an illumination system that is disposed on a downward side of a sample and emits illumination light from the downward side toward an upward side of the sample;

an imaging system that is disposed on the downward side of the sample and images the sample with transmitted light that is reflected on the upward side in the illumination light emitted from the illumination system and is transmitted through the sample from the upward side to the downward side; and a control unit that executes imaging control using the illumination system and the imaging system, and controls an exposure amount in correspondence with required time for the imaging control which includes required operation time and required pause time determined based on imaging conditions, wherein when the required time exceeds a threshold, the control unit updates the imaging condition so that a new required time determined based on the updated new imaging conditions falls within the threshold, and controls the exposure amount based on the new imaging conditions, and wherein the control unit updates the illumination luminance included in the imaging conditions so that the new required time falls within the threshold when the required time exceeds the threshold.

\* \* \* \* \*